United States Patent
Agrawal et al.

(10) Patent No.: US 7,822,832 B2
(45) Date of Patent: Oct. 26, 2010

(54) METHOD FOR CONTROLLING OPERATIONS OF COMPUTING DEVICES

(75) Inventors: Dakshi Agrawal, Monsey, NY (US);
Seraphin Bernard Calo, Cortlandt Manor, NY (US); Casimer Maurice DeCusatis, Poughkeepsie, NY (US);
Gary Lipson, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 12/054,047

(22) Filed: Mar. 24, 2008

(65) Prior Publication Data

US 2008/0167899 A1    Jul. 10, 2008

(51) Int. Cl.
*G06F 15/177* (2006.01)
(52) U.S. Cl. .................................................. 709/220
(58) Field of Classification Search ......... 709/202–203, 709/220–222, 227–230, 206–207, 217–219, 709/224, 226, 244, 248
See application file for complete search history.

(56) References Cited

U.S. PATENT DOCUMENTS

| | | | |
|---|---|---|---|
| 5,666,655 A | 9/1997 | Ishikawa et al. | |
| 6,014,406 A | 1/2000 | Shida et al. | |
| 6,098,098 A * | 8/2000 | Sandahl et al. | 709/221 |
| 6,496,699 B2 * | 12/2002 | Benveniste | 455/452.1 |
| 6,721,880 B1 * | 4/2004 | Pike | 713/1 |
| 6,754,731 B2 * | 6/2004 | Gargi et al. | 710/16 |
| 6,757,266 B1 * | 6/2004 | Hundscheidt | 370/328 |
| 6,775,549 B2 * | 8/2004 | Benveniste | 455/452.1 |
| 6,920,328 B2 | 7/2005 | Wollrab | |
| 7,263,076 B1 | 8/2007 | Leibovitz et al. | |
| 7,421,484 B2 * | 9/2008 | Das | 709/220 |
| 2002/0032780 A1 * | 3/2002 | Moore et al. | 709/228 |
| 2002/0098847 A1 * | 7/2002 | Benveniste | 455/452 |
| 2003/0027581 A1 * | 2/2003 | Jokinen et al. | 455/456 |
| 2003/0064745 A1 * | 4/2003 | Benveniste | 455/522 |
| 2004/0088403 A1 * | 5/2004 | Aggarwal | 709/224 |
| 2004/0116140 A1 * | 6/2004 | Babbar et al. | 455/517 |
| 2005/0149626 A1 * | 7/2005 | Manchester et al. | 709/220 |
| 2005/0193127 A1 * | 9/2005 | Moore et al. | 709/228 |
| 2005/0198221 A1 * | 9/2005 | Manchester et al. | 709/220 |
| 2005/0289071 A1 * | 12/2005 | Goin et al. | 705/56 |
| 2005/0289401 A1 * | 12/2005 | Goin et al. | 714/47 |
| 2006/0047793 A1 | 3/2006 | Agrawal et al. | |
| 2006/0085669 A1 * | 4/2006 | Rostron et al. | 714/4 |
| 2006/0187897 A1 | 8/2006 | Dabbs et al. | |
| 2009/0232311 A1 * | 9/2009 | Meier et al. | 380/277 |
| 2009/0254639 A1 * | 10/2009 | Manchester et al. | 709/220 |

* cited by examiner

*Primary Examiner*—Asad M Nawaz
(74) *Attorney, Agent, or Firm*—Whitham, Curtis, Christofferson & Cook, P.C.; Stephen C. Kaufman

(57) ABSTRACT

The present invention provides a process to establish or configure a mode of operation for computing devices through the use of affinity groups, policy guidelines, and priority graphs. An affinity group is a group of peer devices identified by a network to which a target device is connected as being similar to the target device. Policy guidelines are parameters describing mode or configuration policies for a group of users and reflecting users' identified needs and requirements. A priority graph is a decision tree, which may or may not be graphically represented, describing hierarchically the organization of policies governing the mode or configuration of device operation and capturing the relative priorities of different policies. A key aspect of the present invention involves the sharing of information within an affinity group.

12 Claims, 5 Drawing Sheets

METHOD FOR CONTROLLING OPERATIONS OF COMPUTING DEVICES

BACKGROUND OF THE INVENTION

1. Field of the Invention

The present invention relates to the field of controlling operations of computing devices for a group of users in a networked system.

2. Background Description

This present invention addresses problems encountered in setting privacy policies for users of network enabled computing systems where system policies can vary over time and where policies may vary from system to system.

There is an increasing number of digital computing devices capable of interacting with networked systems, including mobile personal computers, personal digital assistants (PDAs), "smart" cell phones, and other personal electronic devices. These digital devices all have various configuration settings to control how each device will operate.

Access and security configurations for network enabled digital computing devices are highly dependent upon context. The operation of a device may vary as a user travels to different locations, or the requirements may vary over time in the same location. A user working within his or her own corporate firewall, for example, may configure applications to enable others inside the firewall to access confidential documents without encryption; however, the same confidential documents would have to be encrypted if accessible from outside the firewall. To take another example, a PDA user would not normally permit access to the PDA from a public network; however, a user traveling to an airport or other location where public information is available from a network may find it convenient to allow limited access to enable the PDA to receive announcements such as flight schedule changes.

In the current state-of-the-art process for configuring operations of computing devices, a device may store a number of static configuration profiles. For example, a cell phone may have separate configuration profiles for office, car, and home. However, the limited number of profiles available according to the current art may not accurately reflect the environments in which users find themselves. In addition, configuration profiles available according to the current art are "open loop" in the sense that a configuration profile, once it has been set, does not change unless the user explicitly provides input and changes the profile.

Interacting with networks using personal digital computing devices may therefore be cumbersome and inconvenient because of the need manually to reset or adjust configuration settings every time a location change creates a change in a network environment, or a change from one network environment to another. It may also be cumbersome and inconvenience to be required manually to keep track of how a network environment changes over time, or when a change has been made from one network environment to another. These factors discourage the use of portable computing devices to interact with networks in situations where context would require changing configuration settings.

SUMMARY OF THE INVENTION

There is thus an unsatisfied need for business processes to enable personal computing devices automatically to configure, or reconfigure, modes of operation in response to changing environment conditions. Such business processes may enable the use of feedback from the surrounding environment to automate the otherwise burdensome and inconvenient task of making adjustments to configuration settings in personal digital computer devices.

According to the present invention, a process is provided to establish or configure a mode of operation for computing devices based on affinity groups, policy guidelines, and priority graphs. An affinity group is a group of peer devices identified by a network to which a target device is connected as being similar to the target device. Policy guidelines are parameters describing mode or configuration policies for a group of users and reflecting users' identified needs and requirements. A priority graph is a decision tree, which may or may not be graphically represented, describing hierarchically the organization of policies governing the mode or configuration of device operation and capturing the relative priorities of different policies. A key aspect of the present invention involves the sharing of information within an affinity group.

To begin, a target device must be identified and associated with one or more affinity groups. Affinity groups appropriate for association with the target device may be determined based on user-identified needs and requirements, specifics of the target device, and the context in which the device is operating.

A target device may have multiple operating policies as a result of needs and requirements that draw upon different resources in different environments. The target device may have a fixed set operating polices that are either hard coded or may be modified by the user/administrator. A target device may have some needs and requirements that are shared by other devices in an environment (for example, maintaining security of corporate data), while at the same time other needs or requirements may be specific to the target device (for example, checking quotes for a particular stock portfolio from a particular source). Policies governing the mode or configuration of device operation are therefore organized into a hierarchy that captures priorities of different policies; for example, security concerns may override other requests such as access to stock quotes. This hierarchy, which may be represented as a priority graph, may be based on one factor or more than one factor. It is contemplated that the priority graph associated with a computing device will be defined to capture the overall needs and requirements of the affinity group and the particular computing device.

Once an affinity group for a target device is identified, with operating policy guidelines determined and prioritized as described above, new policies may be defined (or existing policies may be redefined) for at least one user in the affinity group. New and redefined policies are made available to each relevant affinity group. A feedback loop (as opposed to the open loop of the current art) is thus established, which may introduce new policies in the affinity group or may change the overall priorities of the already existing policies in the affinity group. This feedback loop frees the user from having to make small configuration changes to changes in the surrounding environment.

If a user changes the configuration of a device, the change is propagated to one or more affinity group with which the device is associated to provide others in the group with access to the feedback information. For example, if a new user is added to an affinity group, the user would automatically be made aware of an existing group policy, and the user would be given an option to accept or reject the policy. (Acceptance or rejection could be automated based on configuration settings established by the user.)

Accepting a group policy makes the user a member of the affinity group and, as a result, the user adopts the priority graph governing the group's activity. This eliminates the need for a user manually to determine or reset policies. For example, a traveler arriving at an airport may join an affinity group used by other airline travelers, which may include settings enabling a device such as a cellphone or wirelessly connectable PDA to obtain access to airline flight information. Such access would disappear when the user leaves the airport and joins another affinity group. Finally, the user must be able to adjust the priority graph depending on certain criteria, such as measuring the effectiveness of the new context.

A user may opt out of information the user does not want to receive. Opting out changes the weight assigned to the information on the priority graph, and may influence other users. If similar changes are made by a weighted majority of the affinity group, then the effect may to be modify the policy guideline, closing the feedback loop. As an example, we could weigh more heavily the changes made by users who have accessed a particular service more frequently, or we could weigh less heavily the changes made by users who have been active in last one hour. Alternatively, the effect may be to divide the affinity group into two or more groups with different information preferences.

The present invention thus enables setting the operating mode of a computing device by: determining at least one affinity group for a computing device; setting policy guidelines for device operation for at least one affinity group; defining a priority graph of policy guidelines for at least one affinity group; changing the priority graph for at least one user of the affinity group relative to other users in the affinity group; and updating the priority graph for the affinity group based on changes in the priority graph by at least one user of the affinity group.

Target computing devices according to the present invention may include not only send-receive devices such as cell phones, PDAs and personal computers with wireless connectivity, wireless handheld email devices and so forth, but also receive-only devices such as satellite radio, music players, paging systems and so forth.

The determination of one or more affinity groups for the device may comprise querying the device for its configuration and attributes, determining the device context including its location and time of day and date, and/or asking the user (or an agent working on behalf of user) at least one question regarding user preferences for device operations.

Setting policy guidelines for device operation for one or more affinity groups may comprise generating policy guidelines to satisfy a legal compliance requirement (for example, security compliance) for an affinity group and/or generating policy guidelines to satisfy an environmental requirement (or example, automatically switching a cell phone to vibrate-only mode in an opera hall or a restaurant).

Defining a priority graph of policy guidelines may comprise assigning each policy a numeric priority, representing at least one policy by at least one node in a graph, connecting two policy nodes with each other by an edge if policies in one node have a precedence over policies in another node, and/or assigning a numeric weight to edge to represent degree of precedence among two policy nodes.

Changing a priority graph for at least one user of an affinity group may comprise enabling a user to change policy elements (including, but not limited to, priority of a policy) and/or enabling a user to define new policies for an affinity group.

Updating a priority graph for an affinity group may comprise introducing a new policy in the priority graph, changing the priority of a policy or modify it otherwise in the priority graph, and/or changing the relative precedence weight among two policies.

According to the present invention, there is therefore provided a method, a computer-readable medium with instructions, and a system for configuring a target device comprising the steps of: identifying a target device connectable to a network; identifying on said network one or a plurality of groups of peer devices which employ configuration settings similar to configuration settings used by the target device; for each of said groups of peer devices, receiving input from the target device as to whether the target device is to be made a member of the group; for each group of which the target device is to be made a member, identifying one or a plurality of default parameters associated with the group, such that each default parameter describes a configuration setting determined to be suitable as a default setting for the configuration to which it relates based on a determination that it is commonly used by members of the group; presenting each of said default parameters to the target device; for each default parameter presented to the target device, receiving input from the target device as to whether the default parameter is to be implemented for the target device and implementing or not implementing the default parameter for the target device in accordance with said input, comparing input received from the target device to input received from other members of said group, determining whether default parameters associated with the group are consistent with configuration choices commonly made by members of said group as expanded to include the target device and, if not, changing default parameters to the extent necessary to reflect configuration choices commonly made by members of the group.

The method, computer-readable medium with instructions, and system of the present invention may also include presenting default parameters to the target device also provides the target device with an opportunity to request default parameters for additional configuration settings not currently associated said group.

In addition, the method, computer-readable medium with instructions, and system of the present invention may further include identifying a target device connectable to a network comprises at least the steps of determining a context for the target device comprising at least the location of the target device and time (which time may comprise time and date, time alone, or date alone) at which it is being identified, and querying the target device for configuration settings of the target device and identification of each configuration setting which is subject to change to conform to a default parameter of a group of peer devices; and wherein the identification on said network of one or a plurality of groups of peer devices which employ configuration settings similar to configuration settings used by the target device is made with reference to said context, said target device configuration settings, and said identification of configuration settings subject to change to conform to default parameters.

The querying of the target device according to the method, computer-readable medium with instructions, and system of the present invention may include a query for prioritization settings to resolve conflicts between group parameters and device configuration settings.

The method, computer-readable medium with instructions, and system of the present invention may further include whether default parameters associated with the group are consistent with configuration choices commonly made by members of said group as expanded to include the target device and, if not, changing default parameters to the extent necessary to reflect configuration choices commonly made by members of a group comprises assigning each parameter a numeric priority, representing each parameter by a node in a decision tree describing hierarchically the organization of parameters, if parameters in one node have a precedence over parameters in another node, connecting the two nodes with each other by an edge, assigning a numeric weight to each edge to represent a degree of precedence between two nodes, and setting default parameters to reflect configuration choices made by members of the group.

The method, computer-readable medium with instructions, and system of the present invention may also include determining whether default parameters associated with the group are consistent with configuration choices commonly made by members of said group as expanded to include the target device and, if not, changing default parameters to the extent necessary to reflect configuration choices commonly made by members of a group further comprises introducing a new parameter in the decision tree describing hierarchically the organization of parameters, changing priorities of parameters in said decision tree to reflect configuration choices made by members of a group, and changing relative precedence weights among parameters in said decision tree to reflect configuration choices made by members of a group.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF A PREFERRED EMBODIMENT OF THE INVENTION

In a preferred embodiment, a method includes the steps of determining a set of policy guidelines for a group of users; defining a hierarchy of the set of policy guidelines for the group; redefining the hierarchy for at least one user of the group of users relative to other users in the group of users; and adjusting the hierarchy based on various criteria, whereby the definition of the hierarchy may change based on location, time, or other variables. To practice this embodiment, a first step would be to determine policy guidelines for a group of users; the policy guideline may be based on business needs (compliance with corporate records retention policies), personal needs (access to stock quote information on a regular basis), or other needs. The policy will likely have several components based on the different sources of identified needs and requirements. Some of the needs may have common goals (for example, maintaining security of personal data) while others may be unique to a certain need class (corporate policy). Thus, it becomes necessary to organize the needs into a hierarchy with priorities; for example, security concerns may over-ride other requests for access to data. The hierarchy can be based from a single factor to many factors, but it is contemplated that the hierarchy is defined to capture the overall requirements of the group. A preferred embodiment of the hierarchy includes a decision tree, with different weights applied to each branch of the tree; where the dominant elements in the hierarchy would have the ability to change dynamically over time (for example, security concerns may be irrelevant in contexts outside the business environment). The policies can be grouped by their scope, and implemented by a contextual filter (for example, security would require that all file transfers pass through an encryption process first).

In an alternate embodiment, the group policy would remain in effect until a statistically and numerically significant number of users changes their policy (this means that a small group of users cannot over-ride a larger group, and within a small group a change in policy by one or two people isn't enough to change the group policy even though they may be a high percentage of the population). In another embodiment, a minority opinion might be enough to change group policy in all cases. This embodiment is likely not optimal, since it could result in a very rapid changing group priority as new users enter or leave the group, and the resulting system may in turn not be stable.

Figure 1:
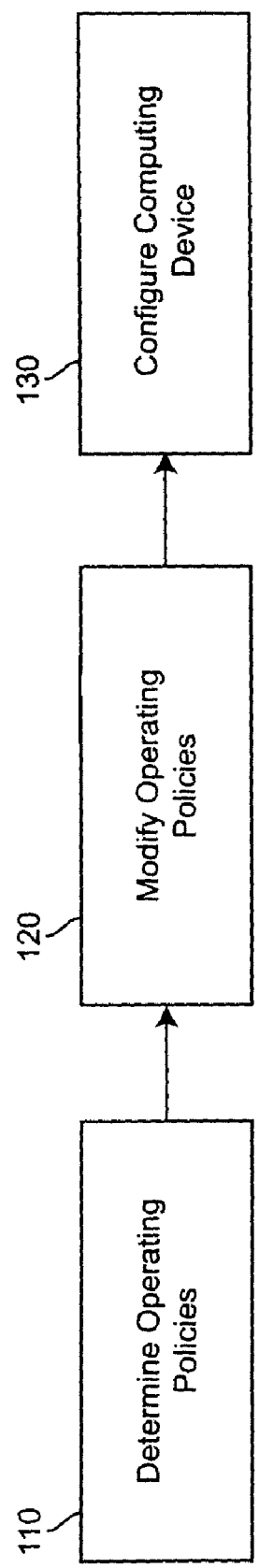
FIG. 1 is a representation of the prior art method of setting the operating mode of a computing device.

Referring now to the drawings, and more particularly to FIG. 1, there is shown a conventional, prior art solution for setting operating mode of a computing device, a set of operating policies for the device is determined based on a rough classification of its context. Operating policies are determined in step 110 and modified in step 120, with the result that the computing device is configured in step 130. A typical user would find that many of the operating policies thus delivered to the device need modifications to accommodate their individual needs. Often modifications are required to address local concerns and needs that are yet to be addressed by the default policies. To address such needs and requirements, a user configures a computing device based on a modified version of the operating policies. Note that the process is "open loop." Changes made by the user do not propagate beyond the user's own computing devices.

Figure 2:
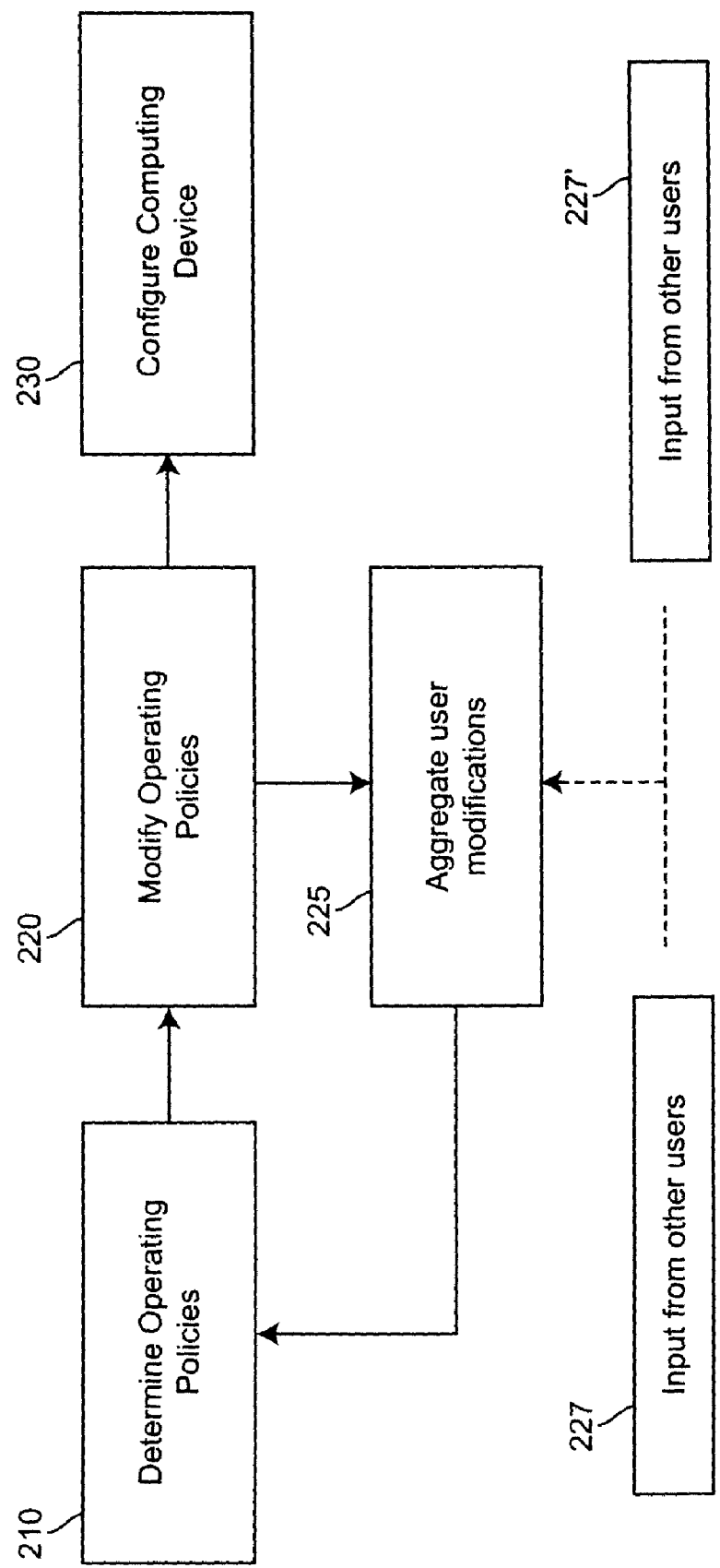
FIG. 2 is a representation of the method of setting the operating mode of a computing device according to the present invention.

Referring to FIG. 2, users are shown grouped in "affinity groups" according to the present invention. Operating policies are determined in step 210 and modified in step 220 in a manner not unlike what is shown in FIG. 1. In step 225, however, input from other users 227, 227' is received for the purpose of aggregating user modifications 225. Thus, policy modifications made by users of an affinity group are aggregated. The aggregated input of users of an affinity group is used to determine operating policies of devices in the group 210. Once device operating policies have been modified 220 based on group operating policies, the computing device is configured 230. Thus, a feedback loop is established, replacing the open loop of prior art solutions. As a result, operating policies can be set more dynamically, and as a consequence we can now set an operating mode for computing devices, which is more responsive to unfolding events in the surrounding environment.

Figure 3:
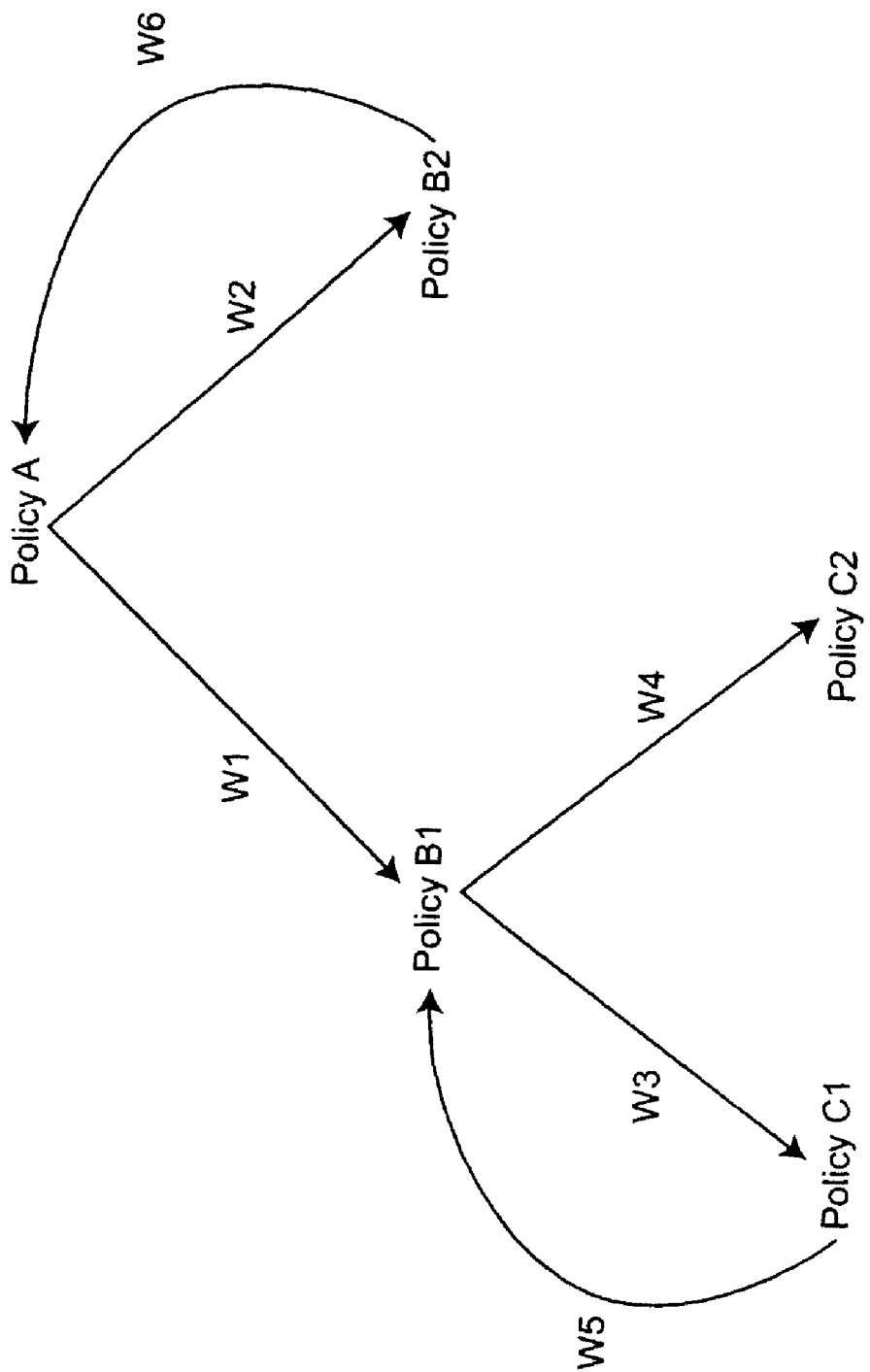
FIG. 3 is a representation of a priority graph of operating policies according to the present invention.

FIG. 3 shows an example of a hierarchy or priority graph for establishing operating policies, including multiple feedback loops to different levels with varying time constants, with edges W1, W2, W3, W4, W5, and W6 between policies A, B1, B2, C1, and C2, such that policy A has priority over a policy Bn and policy B1 has priority over a policy Cn. The model for this process is a simple hierarchical tree with weighted branches and feedback loops, as illustrated in the attached figure. This is a fundamental model for how policies can be organized within a networked group of users, with many applications beyond the illustrative ones shown here. The size of the group and properties of the network interconnections will determine how rapidly changes in user policy propagate back to the hierarchy, altering the decision trees. A process that alters the decision tree must be fast enough to accommodate a particular application (for example, a decision tree which updates every three (3) hours is useless when trying to catch a flight from the airport; updates every few minutes are likely to be desired. On the other hand, if the policy involves transmission of user data to a disaster backup facility each evening, then a three (3) hour update period may be more than adequate). The method described herein may be implemented in many ways, including using wireless technologies (Bluetooth, cellular phones), email, wireless infrared links, or other methods; contextual information may be obtained from various sources, possibly including the user's internal time-of-day clock. It is suggested that some policies (such as work privacy) may be set so that they cannot be overwritten by others in the group ("freezing"); the policy weights are fixed at a value higher than any other in the decision tree and are non-negotiable. Freezing policies would help to prevent hackers from over-riding some policies that are most important to the user.

Figure 4:
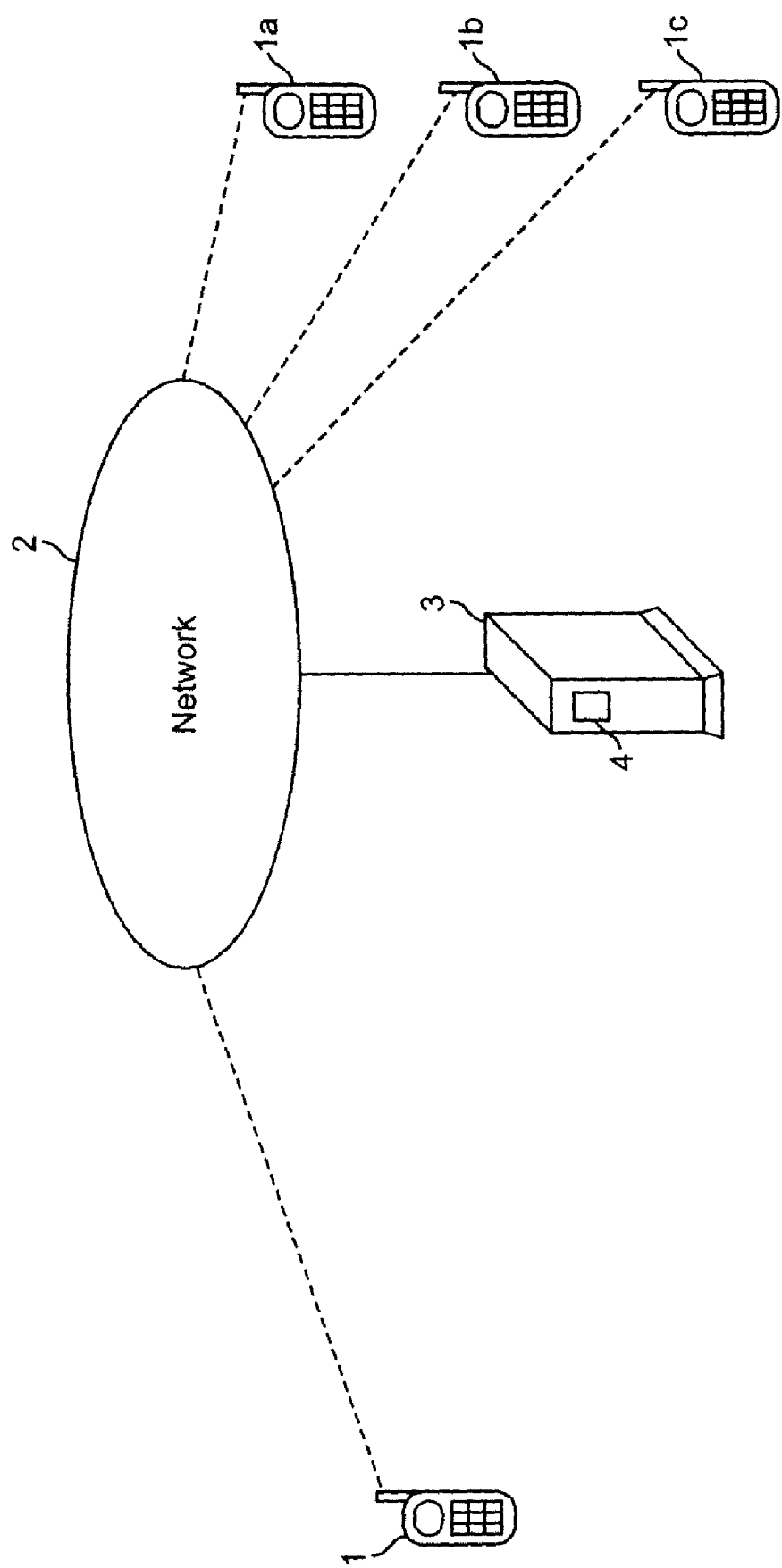
FIG. 4 is a representation of the system and computer-readable medium according to the present invention.

According to FIG. 4, there is shown a target device 1 (in this case a cellular telephone) connected to a computer network 2 to which are also connected peers 1a, 1b, 1c of the target device 1. Also connected to the network 2 is a computer 3, which includes a computer-readable medium 4 to provide instructions to the computer for implementing the method of the present invention.

Figure 5:
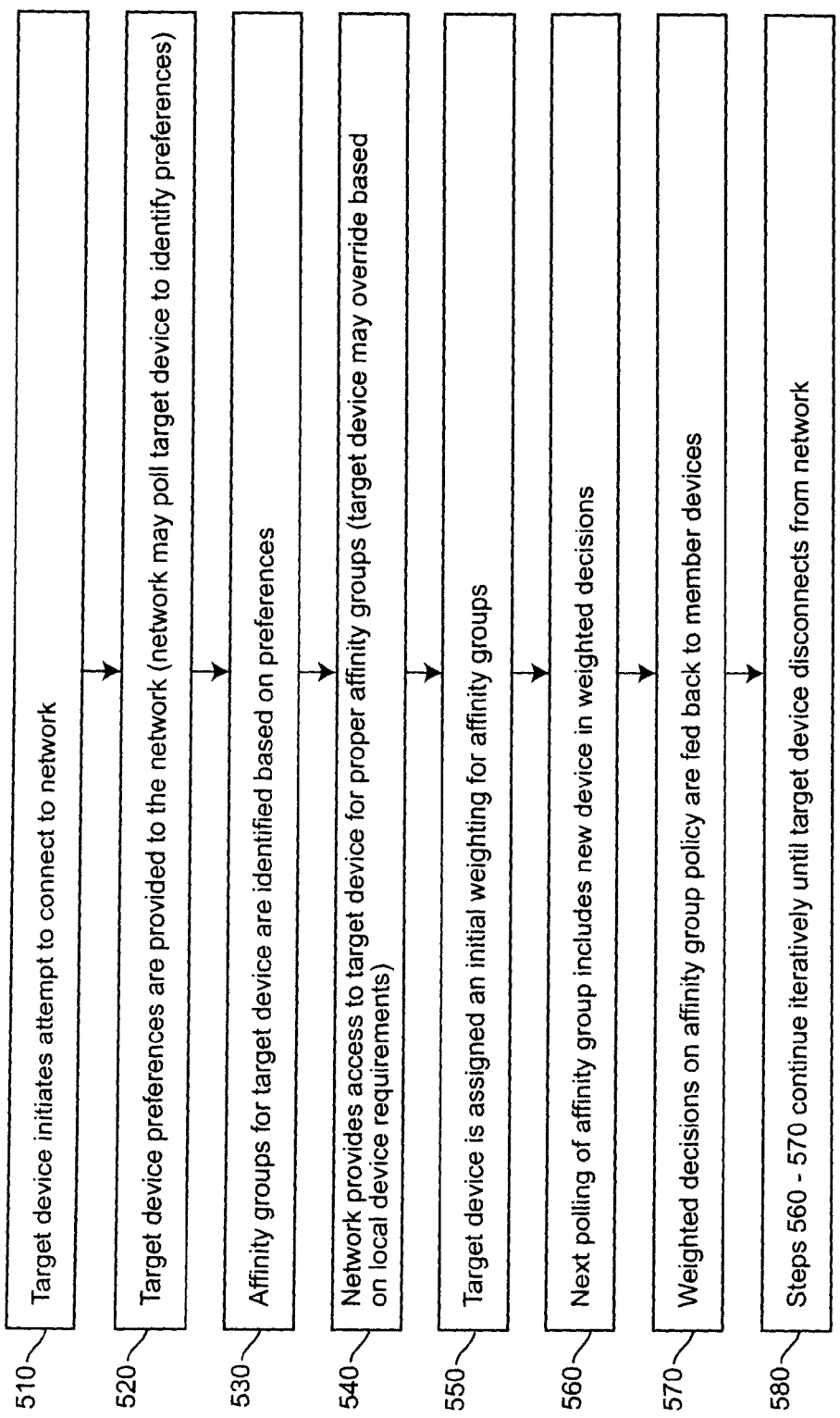
FIG. 5 is a representation of an algorithm for configuring a target device according to the present invention.

According to FIG. 5, there is shown an algorithm for configuring a target device according to the present invention. In step 510, a target device initiates an attempt to connect to a network. In step 520, the target device preferences are provided to the network, which may be done by having the network poll the target device to identify preferences. In step 530, affinity groups for the target device are identified based on preferences. An affinity group is a group of peer devices identified by a network to which a target device is connected as being similar to the target device. In step 540, the network provides proper affinity groups with access to the target device; alternatively, the target device may override such access based on local device requirements. In step 550, the target device is assigned an initial weighting for affinity groups. In step 560, the next polling of an affinity group includes the newly added target device in weighted decisions. In step 570, weighted decisions on affinity group policy are fed back to member devices. Finally, in step 580, steps 560 and 570 continue iteratively until the target device disconnects from network.

Having thus described our invention, what we claim as new and desire to secure by Letters Patent is as follows:

1. A method for configuring a target device comprising the steps of:
    identifying a target device connectable to a computer network;
    identifying on said network one or a plurality of groups of peer devices which employ configuration settings similar to configuration settings used by the target device;
    for each of said groups of peer devices, receiving input from the target device as to whether the target device is to be included as a member of the group;
    for each group of which the target device is to be included as a member, identifying one or a plurality of default parameters associated with the group, such that each default parameter describes a configuration setting determined to be suitable as a default setting for the configuration to which it relates based on a determination that it is commonly used by members of the group;
    presenting each of said default parameters to the target device;
    for each default parameter presented to the target device,
        receiving input from the target device as to whether the default parameter is to be implemented for the target device and implementing or not implementing the default parameter for the target device in accordance with said input,
        comparing input received from the target device to input received from other members of said group,
        determining whether default parameters associated with the group are consistent with configuration choices commonly made by members of said group as expanded to include the target device and, if not, changing default parameters to the extent necessary to reflect configuration choices commonly made by members of the group, and
    wherein
    the step of identifying a target device connectable to a network comprises at least the steps of:
        determining a context for the target device comprising at least the location of the target device and time at which it is being identified, and
        querying the target device for
            configuration settings of the target device and
            identification of each configuration setting which is subject to change to conform to a default parameter of a group of peer devices; and wherein
    the identification on said network of one or a plurality of groups of peer devices which employ configuration settings similar to configuration settings used by the target device is made with reference to said context, said target device configuration settings, and said identification of configuration settings subject to change to conform to default parameters.

2. The method of claim 1, wherein the step of presenting default parameters to the target device also provides the target device with an opportunity to request default parameters for additional configuration settings not currently associated said group.

3. The method of claim 1, wherein the querying of the target device includes a query for prioritization settings to resolve conflicts between group parameters and device configuration settings.

4. A method for configuring a target device comprising the steps of:
    identifying a target device connectable to a computer network;
    identifying on said network one or a plurality of groups of peer devices which employ configuration settings similar to configuration settings used by the target device;
    for each of said groups of peer devices, receiving input from the target device as to whether the target device is to be included as a member of the group;
    for each group of which the target device is to be included as a member, identifying one or a plurality of default parameters associated with the group, such that each default parameter describes a configuration setting determined to be suitable as a default setting for the configuration to which it relates based on a determination that it is commonly used by members of the group;
    presenting each of said default parameters to the target device;
    for each default parameter presented to the target device,
        receiving input from the target device as to whether the default parameter is to he implemented for the target device and implementing or not implementing the default parameter for the target device in accordance with said input, comparing input received from the target device to input received from other members of said group, determining whether default parameters associated with the group are consistent with configuration choices commonly made by members of said group as expanded to include the target device and, if not, changing default parameters to the extent necessary to reflect configuration choices commonly made by members of the group, and wherein the step of determining whether default parameters associated with the group are consistent with configuration choices commonly made by members of said group as expanded to include the target device and, if not, changing default parameters to the extent necessary to reflect configuration choices commonly made by members of the group comprises:

assigning each parameter a numeric priority, representing each parameter by a node in a decision tree describing hierarchically the organization of parameters, if parameters in one node have a precedence over parameters in another node, connecting the two nodes with each other by an edge, assigning a numeric weight to each edge to represent a degree of precedence between two nodes, and setting default parameters to reflect configuration choices made by members of the group.

5. The method of claim 4, wherein the step of determining whether default parameters associated with the group are consistent with configuration choices commonly made by members of said group as expanded to include the target device and, if not, changing default parameters to the extent necessary to reflect configuration choices commonly made by members of a group further comprises:

introducing a new parameter in the decision tree describing hierarchically the organization of parameters, changing priorities of parameters in said decision tree to reflect configuration choices made by members of a group, and changing relative precedence weights among parameters in said decision tree to reflect configuration choices made by members of a group.

6. The method of claim 4, wherein the step of presenting default parameters to the target device also provides the target device with an opportunity to request default parameters for additional configuration settings not currently associated said group.

7. A system for configuring a target device, comprising:

a target device and a computer network to which the target device may be connected;

one or a plurality of groups of devices which are peers to the target device and which may be identified as employing configuration settings similar to configuration settings used. by the target device;

a computer, connected to the network, receiving input from the target device, for each of said groups of peer devices, as to whether the target device is to be made a member of the group;

a computer, connected to the network, identifying one or a plurality of default parameters associated with each group of which the target device is to be made a member, such that each default parameter describes a configuration setting determined to be suitable as a default setting for the configuration to which it relates based on a determination that it is commonly used by members of the group;

a computer, connected to the network, presenting each of said default parameters to the target device;

a computer, connected to the network, presenting each default parameter presented to the target device and receiving input from the target device as to whether the default parameter is to be implemented for the target device and implementing or not implementing the default parameter for the target device in accordance with said input, comparing input received from the target device to input received from other members of said group, determining whether default parameters associated with the group are consistent with configuration choices commonly made by members of said group as expanded to include the target device and, if not, changing default parameters to the extent necessary to reflect configuration choices commonly made by members of the group, and wherein the computer identifying a target device connectable to the network also determines a context for the target device comprising at least the location of the target device and time at which it is being identified, and queries the target device for configuration settings of the target device and identification of each configuration setting which is subject to change to conform to a default parameter of a group of peer devices; and wherein the computer identifying on said network of one or a plurality of groups of peer devices which employ configuration settings similar to configuration settings used by the target device include instructions for processing data describing said context, said target device configuration settings, and said identification of configuration settings subject to change to conform to default parameters.

8. The system of claim 7, wherein the computer presenting default parameters to the target device also provides the target device with an opportunity to request default parameters for additional configuration settings not currently associated said group.

9. The system of claim 7, wherein the computer querying the target device also queries for priority settings to resolve conflicts between group parameters and device configuration settings.

10. A system for configuring a target device, comprising:

a target device and a computer network to which the target device may be connected;

one or a plurality of groups of devices which are peers to the target device and which may be identified as employing configuration settings similar to configuration settings used by the target device;

a computer, connected to the network, receiving input from the target device, for each of said groups of peer devices, as to whether the target device is to be made a member of the group;

a computer, connected to the network, identifying one or a plurality of default parameters associated with each group of which the target device is to be made a member, such that each default parameter describes a configuration setting determined to be suitable as a default setting for the configuration to which it relates based on a determination that it is commonly used by members of the group;

a computer, connected to the network, presenting each of said default parameters to the target device;

a computer, connected to the network, presenting each default parameter presented to the target device and receiving input from the target device as to whether the default parameter is to be implemented for the target device and implementing or not implementing the default parameter for the target device in accordance with said input, comparing input received from the target device to input received from other members of said group, determining whether default parameters associated with the group are consistent with configuration choices commonly made by members of said group as expanded to include the target device and, if not, changing default parameters to the extent necessary to reflect configuration choices commonly made by members of the group, and wherein the computer determining whether default parameters associated with the group are consistent with configuration choices commonly made by members of said group as expanded to include the target device and, if not, changing default parameters to the extent necessary to reflect configuration choices commonly made by members of a group also assigns each parameter a numeric priority, represents each parameter by a node in a decision tree describing hierarchically the organization of parameters, connects the two nodes with each other by an edge, if parameters in one node have a precedence over parameters in another node, assigns a numeric weight to each edge to represent a degree of precedence between two nodes, and sets default parameters to reflect configuration choices made by members of the group.

11. The system of claim 10, wherein the computer determining whether default parameters associated with the group are consistent with configuration choices commonly made by members of said group as expanded to include the target device and, if not, changing default parameters to the extent necessary to reflect configuration choices commonly made by members of a group also introduces a new parameter in the decision tree describing hierarchically the organization of parameters, changes priorities of parameters in said decision tree to reflect configuration choices made by members of a group, and changes relative precedence weights among parameters in said decision tree to reflect configuration choices made by members of a group.

12. The system of claim 10, wherein the computer presenting default parameters to the target device also provides the target device with an opportunity to request default parameters for additional configuration settings not currently associated said group.

* * * * *